United States Patent
Naqvi

(10) Patent No.: US 9,730,232 B2
(45) Date of Patent: *Aug. 8, 2017

(54) SYSTEM AND METHOD FOR CONTROL AND MANAGEMENT OF RESOURCES FOR CONSUMERS OF INFORMATION

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,202

(22) Filed: Jan. 5, 2017

(65) Prior Publication Data

US 2017/0118746 A1 Apr. 27, 2017

Related U.S. Application Data

(63) Continuation of application No. 15/244,250, filed on Aug. 23, 2016, which is a continuation of application No. 14/920,112, filed on Oct. 22, 2015, now Pat. No. 9,445,351, which is a continuation of application No. 12/804,448, filed on Jul. 21, 2010, now Pat. No. 9,210,528.

(51) Int. Cl.
| | | |
|---|---|---|
| *H04W 4/00* | (2009.01) | |
| *H04W 72/04* | (2009.01) | |
| *H04W 8/04* | (2009.01) | |
| *H04W 8/20* | (2009.01) | |
| *H04W 72/00* | (2009.01) | |

(52) U.S. Cl.
CPC .......... *H04W 72/048* (2013.01); *H04W 8/04* (2013.01); *H04W 8/20* (2013.01); *H04W 72/005* (2013.01)

(58) Field of Classification Search
CPC ..... H04W 8/183; H04W 8/245; H04W 88/02; H04M 1/72519
USPC ............ 455/432.1, 550.1, 418, 422.1, 432.3
See application file for complete search history.

(56) References Cited

U.S. PATENT DOCUMENTS

| | | | |
|---|---|---|---|
| 4,360,875 A | 11/1982 | Behnke | |
| 5,604,676 A | 2/1997 | Penzias | |

(Continued)

FOREIGN PATENT DOCUMENTS

| | | |
|---|---|---|
| EP | 1372309 | 12/2003 |
| WO | 2007/002604 | 1/2007 |

OTHER PUBLICATIONS

UberCab Takes the Hassle Out of Booking a Car Service by Leena Rao on Jul. 5, 2010, 6 pages downloaded at https://web.archive.org/web/20100708015701/http:/techcrunch.com/2010/07/05/ubercab-takes-the-hassle-out-of-booking-a-car-service/.

(Continued)

*Primary Examiner* — Danh Le
(74) *Attorney, Agent, or Firm* — Mayer & Williams, PC; Stuart Mayer

(57) ABSTRACT

A system and method is provided for using information broadcast by devices and resources in the immediate vicinity of a mobile device, or by sensors located within the mobile device itself, to ascertain and make a determination of the immediate environment and state of the mobile device. This determination may be used to control and manage the actions that the device is asked to carry out by or on behalf of the user.

46 Claims, 6 Drawing Sheets

(56) References Cited

U.S. PATENT DOCUMENTS

| | | | |
|---|---|---|---|
| 5,608,778 A | 3/1997 | Partridge, III | |
| 6,697,730 B2 | 2/2004 | Dickerson | |
| 6,785,542 B1* | 8/2004 | Blight | H04W 48/16 340/7.23 |
| 6,876,867 B2* | 4/2005 | Tiedemann, Jr. | H04W 52/08 455/115.1 |
| 6,912,386 B1 | 6/2005 | Himberg et al. | |
| 7,206,559 B2 | 4/2007 | Meade, II | |
| 7,224,698 B2 | 5/2007 | Kreiner | |
| 7,266,595 B1 | 9/2007 | Black | |
| 7,302,481 B1 | 11/2007 | Wilson | |
| 7,363,031 B1 | 4/2008 | Aisa | |
| 7,379,464 B2 | 5/2008 | Kreiner | |
| 7,400,891 B2 | 7/2008 | Aaron | |
| 7,539,723 B2 | 5/2009 | Agrawal | |
| 7,548,886 B2 | 6/2009 | Kirkland et al. | |
| 7,561,535 B2 | 7/2009 | Naqvi | |
| 7,672,297 B2 | 3/2010 | Naqvi | |
| 7,724,753 B2 | 5/2010 | Naqvi | |
| 7,756,633 B2 | 7/2010 | Huang | |
| 7,773,972 B2 | 8/2010 | Croome | |
| 7,792,528 B2 | 9/2010 | Naqvi | |
| 7,802,292 B2 | 9/2010 | Shaw | |
| 7,840,427 B2 | 11/2010 | O'Sullivan | |
| 7,856,226 B2 | 12/2010 | Wong et al. | |
| 7,864,936 B2 | 1/2011 | Naqvi | |
| 7,890,743 B2 | 2/2011 | Buchanan | |
| 7,908,208 B2* | 3/2011 | Juarez | G06Q 30/02 705/35 |
| 8,026,814 B1* | 9/2011 | Heinze | G06Q 10/06 340/10.1 |
| 8,170,534 B2 | 5/2012 | Naqvi | |
| 8,195,188 B2 | 6/2012 | Fomukong | |
| 8,285,571 B2 | 10/2012 | Demirdjian | |
| 8,320,272 B2 | 11/2012 | Kahn | |
| 8,326,001 B2 | 12/2012 | Free | |
| 8,427,303 B1 | 4/2013 | Brady | |
| 8,432,899 B2 | 4/2013 | Naqvi | |
| 8,433,303 B2 | 4/2013 | Naqvi | |
| 8,479,266 B1 | 7/2013 | Delker | |
| 8,483,373 B2 | 7/2013 | Naqvi | |
| 8,504,921 B2 | 8/2013 | Wilson | |
| 8,532,069 B2 | 9/2013 | Balwani | |
| 8,553,866 B2 | 10/2013 | Naqvi | |
| 8,565,820 B2 | 10/2013 | Riemer | |
| 8,611,334 B2 | 12/2013 | Naqvi | |
| 8,620,354 B2 | 12/2013 | Beasley | |
| 8,666,894 B1 | 3/2014 | Buch et al. | |
| 8,726,390 B1 | 5/2014 | Martini | |
| 8,730,945 B2 | 5/2014 | Naqvi | |
| 8,787,936 B2 | 7/2014 | Tibbitts | |
| 8,929,857 B2 | 1/2015 | Baker | |
| 8,931,001 B2 | 1/2015 | Wilson | |
| 8,947,696 B1 | 2/2015 | Uyttendaele | |
| 8,953,566 B2 | 2/2015 | Hegde | |
| 9,077,611 B2 | 7/2015 | Cordray | |
| 9,300,739 B2 | 3/2016 | Deprun | |
| 9,325,510 B2 | 4/2016 | Deprun | |
| 9,467,562 B2 | 10/2016 | Bozionek | |
| 9,537,866 B2 | 1/2017 | Mcdonald | |
| 2002/0130176 A1 | 9/2002 | Suzuki | |
| 2003/0071117 A1 | 4/2003 | Meade, II | |
| 2003/0073411 A1 | 4/2003 | Meade, II | |
| 2003/0073432 A1 | 4/2003 | Meade, II | |
| 2004/0125993 A1 | 7/2004 | Zhao | |
| 2004/0137925 A1 | 7/2004 | Lowe | |
| 2004/0158618 A1 | 8/2004 | Shaw | |
| 2004/0256474 A1 | 12/2004 | Park | |
| 2005/0102358 A1 | 5/2005 | Gold | |
| 2006/0069717 A1 | 3/2006 | Mamou | |
| 2006/0179056 A1 | 8/2006 | Rosenberg | |
| 2006/0270350 A1 | 11/2006 | Kim | |
| 2007/0055785 A1 | 3/2007 | Stevens | |
| 2007/0281713 A1 | 12/2007 | Mullen | |
| 2008/0052395 A1 | 2/2008 | Wright | |
| 2008/0092155 A1 | 4/2008 | Ferrone | |
| 2008/0092156 A1 | 4/2008 | Ferrone | |
| 2008/0137646 A1 | 6/2008 | Agarwal | |
| 2008/0162346 A1 | 7/2008 | Aaron et al. | |
| 2008/0164308 A1 | 7/2008 | Aaron et al. | |
| 2009/0077645 A1 | 3/2009 | Kottahachchi | |
| 2009/0119384 A1 | 5/2009 | Kreiner | |
| 2009/0124241 A1 | 5/2009 | Krishnaswamy | |
| 2009/0132362 A1 | 5/2009 | Fisher | |
| 2009/0152343 A1 | 6/2009 | Carter | |
| 2009/0169018 A1 | 7/2009 | Deisher | |
| 2009/0183178 A1 | 7/2009 | Imai | |
| 2009/0222907 A1 | 9/2009 | Guichard | |
| 2009/0234850 A1 | 9/2009 | Kocsis | |
| 2009/0252113 A1* | 10/2009 | Take | H04W 36/30 370/331 |
| 2009/0264131 A1 | 10/2009 | Wu | |
| 2009/0299853 A1* | 12/2009 | Jones | G06Q 30/02 705/14.46 |
| 2009/0299990 A1 | 12/2009 | Setlur | |
| 2009/0309711 A1 | 12/2009 | Adappa | |
| 2010/0009657 A1 | 1/2010 | Dingler et al. | |
| 2010/0057485 A1 | 3/2010 | Luft | |
| 2010/0057562 A1* | 3/2010 | Gabbay | G06Q 30/0254 705/14.52 |
| 2010/0088532 A1 | 4/2010 | Pollack | |
| 2010/0107225 A1 | 4/2010 | Spencer | |
| 2010/0113065 A1 | 5/2010 | Narayan et al. | |
| 2010/0121684 A1 | 5/2010 | Morio et al. | |
| 2010/0122281 A1* | 5/2010 | Wang | H04L 63/10 725/25 |
| 2010/0167691 A1 | 7/2010 | Howarter | |
| 2010/0191604 A1 | 7/2010 | Raleigh | |
| 2010/0225493 A1 | 9/2010 | Zishaan | |
| 2010/0227691 A1 | 9/2010 | Karsten | |
| 2010/0299451 A1 | 11/2010 | Yigang et al. | |
| 2010/0319059 A1 | 12/2010 | Agarwal | |
| 2010/0323657 A1 | 12/2010 | Barnard | |
| 2011/0009107 A1 | 1/2011 | Guba | |
| 2011/0010543 A1 | 1/2011 | Schmidt | |
| 2011/0077028 A1 | 3/2011 | Wilkes et al. | |
| 2011/0093161 A1 | 4/2011 | Zhou | |
| 2011/0099040 A1 | 4/2011 | Felt | |
| 2011/0153759 A1 | 6/2011 | Rathod | |
| 2011/0158090 A1 | 6/2011 | Riley | |
| 2011/0167105 A1 | 7/2011 | Ramakrishnan | |
| 2011/0202293 A1 | 8/2011 | Kobraei | |
| 2011/0208822 A1 | 8/2011 | Rathod | |
| 2011/0225293 A1 | 9/2011 | Rathod | |
| 2011/0235549 A1* | 9/2011 | Ahlers | H04L 41/08 370/255 |
| 2011/0257973 A1 | 10/2011 | Chutorash et al. | |
| 2011/0275321 A1 | 11/2011 | Zhou | |
| 2011/0276396 A1 | 11/2011 | Rathod | |
| 2011/0276981 A1* | 11/2011 | Clohessy | G06F 9/5016 718/104 |
| 2011/0289392 A1 | 11/2011 | Naqvi | |
| 2011/0294520 A1 | 12/2011 | Zhou | |
| 2011/0313804 A1 | 12/2011 | Camp | |
| 2012/0010867 A1 | 1/2012 | Eder | |
| 2012/0021770 A1 | 1/2012 | Naqvi | |
| 2012/0028624 A1 | 2/2012 | Jedlicka | |
| 2012/0101903 A1 | 4/2012 | Oh | |
| 2012/0150601 A1 | 6/2012 | Fisher | |
| 2012/0165042 A1 | 6/2012 | Cho | |
| 2012/0177045 A1 | 7/2012 | Berman | |
| 2012/0214463 A1 | 8/2012 | Smith et al. | |
| 2012/0258161 A1 | 10/2012 | Patel | |
| 2012/0271715 A1 | 10/2012 | Morton | |
| 2012/0303439 A1 | 11/2012 | Flitcroft | |
| 2012/0316962 A1 | 12/2012 | Rathod | |
| 2013/0029693 A1 | 1/2013 | Bradley | |
| 2013/0132277 A1 | 5/2013 | Naqvi | |
| 2013/0295908 A1 | 11/2013 | Zeinstra et al. | |
| 2014/0129393 A1 | 5/2014 | Soon-Shiong | |
| 2014/0129942 A1 | 5/2014 | Rathod | |
| 2014/0143341 A1 | 5/2014 | Brady | |
| 2014/0258471 A1 | 9/2014 | Etchegoyen | |
| 2014/0295804 A1 | 10/2014 | Naqvi | |

(56) References Cited

U.S. PATENT DOCUMENTS

2014/0370869 A1 12/2014 Naqvi
2015/0073901 A1 3/2015 Arnold
2015/0088701 A1 3/2015 Desmarais

OTHER PUBLICATIONS

Hastie, et al., "The Elements of Statistical Learning, Data Mining, Inference and Prediction" Second Edition, copyright 2009, Chapter 2: "Overview of Supevised Learning", pp. 9-39.
Tofel, "With New Apps Google Now May Be Your Future Home Screen", dated Jan. 30, 2015. Downloaded at https://gigaom.com/2015/01/30/with-new-apps-google-now-may-be-your-future-home-screen/, 8 pages.
Frost, "iBeacon in iOS 8 getting location based notifications, plus: FCC filing suggests Apple to launch own iBeacon hardware", dated Sep. 2, 2014. Downloaded at http://www.macworld.co.uk/news/iosapps/apples-plans-for-bacon-hardware-new-ios-8-location-notification-3542708/, 5 pages.
Morozov: To Save Everything, Chick Here, www.publicaffairsbooks.com/ see also Perseus Books, 2013.
Constine, "Vurb is Crazy Engough to Fight Google", Feb. 2015 14 pages.
Fan "How Cards are Quitely Transforming the Web", Feb. 2015, 10 pages.
Author Unknown, "Technical Solution Ideas" downloaded at https://web.archive.org/web/20100823055621/http://ddfn.org/ideas.asp Downloaded on May 9, 2017.
Author Unknown "Solution Providers | Distracted Driving Foundation" 5 pages, downloaded at http://www.ddfn.org/solutionsproviders/ on Mar. 27, 2017.
Sensing motion in a mobile phone and limiting functionality of moving phones Submitted to Distracted Driving Foundation by Marie Stewart, Jun. 20, 2010, downloaded at http://www.ddfn.org/pdfs/StewartPhoneDisablingSystem.pdf.
Author unknown, "Exempt from automatic restriction of functionality moving phones accompanied by an override transmitter" downloaded at http://www.ddfn.org/pdfs/HaleyPhoneRestrictionSystemv247.10.pdf downloaded May 9, 2017.
Author Unknown, "What is Drive Alive?" downloaded http://www.ddfn.org/pdfs/DDFNdocumentDriveAlive.pdf, downloaded May 9, 2017.
Author Unknown, "Car Key Jams Teen Drivers' Cell Phones" copyright 2008 downloaded at https://web.archive.org/web/20090214155734/http://www.unews.utah.edu/p/?r=1208081 on Mar. 21, 2017, 3 pages.
Author Unknown, "K2SD Workflow", copyright 2007, 2 pages downloaded at https://web.archive.org/web/20090429012022/http://key2safedriving.net/Technology.aspx, downloaded May 9, 2017.
Author Unknown, "Textecution—Premium Mobile Device Safety Application" copyright 2009 downloaded at https://web.archive.org/web/20090705190653/http:/textecution.com/how_does_it_work.php, downloaded on May 9, 2017.
Author Unknown, "cellcontrol_Reducing Distractions While Driving", copyright 2009, downloaded at https://web.archive.org/web/20091208041109/http://cellcontrol.com/index.html, downloaded on May. 9, 2017.
Author Unknown, "cellcontrol_How It Works!" copyright 2009 downloaded at https://web.archive.org/web/20091209040335/http://www.cellcontrol.com/how.html, downloaded on May 9, 2017.
Jay Przybyla, "Cell Phone Use While Driving: A Literature Review and Recommendations" dated Dec. 11, 2008; downloaded at http://www.civil.utah.edu/~zhou/cell_phone_and_distracted_driver.pdf, downloaded on May 9, 2017.
David Teater, "Distracted driving" copyright 2009 downloaded at http://www.nsc.org/Membership%20Site%20Document%20Library/Recorded-Webinars/Corporate%20Distracted%20Driving%20Copy%20NSC%20National%20Safety%20Month.pdf, downloaded on May 9, 2017.

* cited by examiner

SYSTEM AND METHOD FOR CONTROL AND MANAGEMENT OF RESOURCES FOR CONSUMERS OF INFORMATION

BACKGROUND OF THE INVENTION

Field of the Invention

The present invention relates to the delivery, discovery, management and control of information to mobile consumers, and more particularly to consumers who have access to multiple devices, capabilities and networks, and to the efficient use and control of these resources to consume and generate information.

Description of the Related Art

It has become customary for people to generate and consume information in a variety of contexts and situations. This need is never more prominent as when people are mobile. Starting with the simply stated need to be "reachable," people now want to be connected to various information resources and use the associated networks and resources to carry out simple and complex tasks that they face everyday.

A decade or so ago, the personal computer (PC), either desktop or laptop, was the main tool for accessing information. A necessary aspect of the PC is that it requires almost the complete attention of the user, i.e., it is difficult to do many other things at the same time as using the PC because of the tethering, weight, and form factor of the device. With the advent of mobile computing devices such as smartphones, it is now commonplace to find people attempting multiple tasks simultaneously, e.g., driving while talking on a mobile phone. In some cases multi-tasking is useful and advantageous, while in other cases it may be physically dangerous to others and oneself. Management of capabilities that are potentially available to a consumer would be an extremely valuable service.

The systems and methods in use today that enable a user to be "reachable" or to have access rely heavily on the user carrying a mobile device. However, mobile devices often have limitations in bandwidth, capacity or connectivity that prevent their use in certain situations. For example, consider a mobile device that may be connected to a network that has low bandwidth but is within range of other resources, e.g., a different network that provides more bandwidth. A mobile device, however, may only support one network interface and, hence, may not be capable of utilizing the higher bandwidth network because it is connected to the lower bandwidth network.

Even when a mobile device is connected to a resource (i.e., access network, display device, storage and computing resource, etc.), it may not be adequately connected since the suitability of a connection depends on the service, i.e., the application that the user intends to run on the device. In present day mobile computing environments some applications mandate a certain type of network. For example, early versions of the iPhone mandated that mobile video could only be accessed using a WiFi network. More recent versions of the iPhone support both WiFi and cellular 3G access to mobile video resources, leaving the user to decide which access network to use, or the device uses a programmed policy to choose a network type.

The current trend in mobile devices and networks is to support multiple radios and multiple radio access bearers (mRAB), a feature of the so-called 3G UMTS (Universal Mobile Terrestrial System) technology. With the introduction of various types of networking technologies, it is expected that a variety of devices will broadcast information about themselves and their capabilities for other devices to use.

Thus, the ability of devices to carry out multiple simultaneous tasks is expected to continue to grow. A device concurrently executing a multiplicity of tasks has need for many resources and may carry out those tasks more efficiently by switching resources around. A pre-determined policy of matching resources to tasks, however, may be too restrictive. Allowing a single application to demand a resource without knowledge of all the resource options may be of detriment to it and other concurrent applications.

Further, when concurrent applications are being run on a mobile device, the service provider may choose to disallow the concurrent execution of certain applications, e.g., initiating a voice call and a mobile video session while a video session is in progress. Alternatively, certain combinations of concurrent applications may be allowed or disallowed only when certain resources are or become available.

For example, in some networks, call forwarding commands were disallowed when such commands led from one device to another that was previously in the call forwarding loop. But detecting such feature interaction problems is computationally difficult and in general undefined. The problem becomes further complicated when external resources become a part of the problem specification.

There is, therefore, a need for an entity to match the needs of concurrent mobile applications on a mobile device with the available resources in the device's environment in order for successfully carrying out or limiting and controlling the tasks at hand.

SUMMARY OF THE INVENTION

These and other drawbacks in the prior art are overcome in large part by a system and method according to embodiments of the present invention.

A telecommunications method in accordance with embodiments of the present invention includes receiving registry map information of network environmental indicia from a mobile device concurrently along with location information to a home location registry; generating an environment map for the mobile device based on the registry map information, the environment map including a device, application, and network component environment; defining service provisioning based on the environment map in response to a request for service from the mobile device, the service provisioning including and excluding predetermined elements of the environment map; and providing network service in accordance with the defined service provisioning. In some embodiments, the service provisioning includes accommodating a service provider policy. In others, the service provisioning includes accommodating a user selected preference. Further embodiments include defining a user context based on the environment map and including or excluding predetermined elements for provisioning based on the user context. A telecommunications system in accordance with embodiments of the present invention includes a plurality of user devices, the user devices configured to monitor available resources and dynamically maintain a resource registry of the available resources and transmit the registry to a service provider; a service delivery platform associated with the service provider and configured to dynamically maintain profiles of a plurality of user devices based on the resource registry information and allow access to resources based on the profiles. In some embodiments, the plurality of user device configured to maintain a capabilities list of user device attributes. The user devices may include one or more sensors for identifying a physical device environment and storing physical device environment information in the registry and may be configured to transmit the resource registry information to the service provider during a home location register location update. In some embodiments, the plurality of user devices are configured to transmit the resource registry information to the service provider as binary-coded data during a home location register location update. In some embodiments, the profiles define access based on physical device environment.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1:
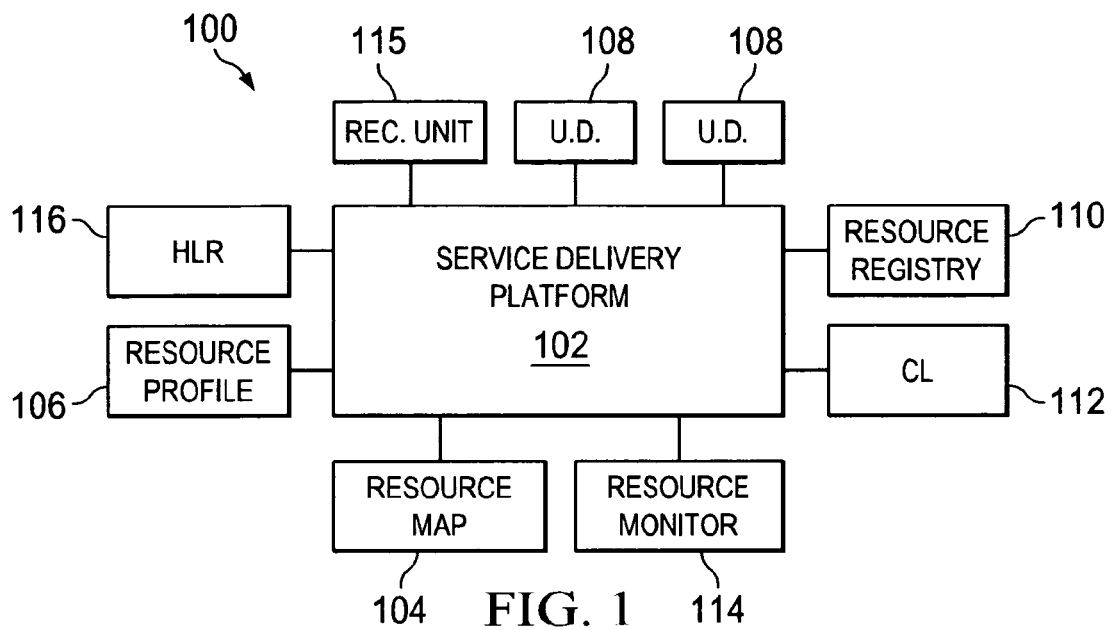
FIG. 1 illustrates an exemplary system according to embodiments of the present invention.

In accordance with embodiments of the present invention, a system and method is provided for using information broadcast by devices and resources in the immediate vicinity of a mobile device, or by sensors located within the mobile device itself, to ascertain and make a determination of the immediate environment and state of the mobile device. This determination may be used to control and manage the actions that the device is asked to carry out by or on behalf of the user.

Advantageously, a carrier can define hundreds of device profiles and automatically and dynamically associate them with user devices, based on the device sensing its environment. The profiles allow or disallow certain actions or combinations of actions, as will be described in greater detail below.

Embodiments of the present invention address locating mobile devices in a telecommunications network that uses a mechanism of "paging requests" by certain network elements and "location updates" by mobile devices to update and maintain a database called the Home Location register (HLR). The term "location" typically refers to the cellular site (cell site) within which the mobile device was last known to be located, although other location methods may be employed.

In accordance with embodiments of the present invention, paging requests and location updates include not only cell site information, but also the availability of other access networks to the mobile device such as WiFi, Bluetooth, WiMax, etc. Moreover, any other resources, e.g., display devices, that could be used in conjunction with the mobile device that are "attached" to the new access network and which "announce" their capabilities and availability are also included in the updates. Internal sensor information, such as device orientation, may also be provided.

The information so obtained from the environment surrounding a mobile device is captured in a series of update messages, referred to as resource updates, by a network facility that processes and stores the messages.

In an exemplary embodiment of the present invention, the mobile device contains a registry wherein all applications are authenticated and registered before they can be used in the mobile device. The registry may additionally contain a profile stating what resources an application needs. A network facility uses an application profile and the information obtained from resource updates to dynamically assign a profile to the mobile device. This profile may be re-assigned and modified whenever the resource updates or the registry information in the mobile device warrant a change based on service logic executing in the network facility.

Consider, for example, a mobile device that is engaged in a voice telephone call connected to a circuit-switched network. Assume the mobile device contains applications for streaming mobile video and SMS text messaging, the applications registered within the registry of the mobile device. The mobile device will have an associated profile in the network facility that details the resources available to the mobile device, i.e., the circuit-switched network, the mobile video and SMS applications, and any resources needed by the applications.

Now, assume a Bluetooth access network announces itself, its capabilities and its resources. For example, the Bluetooth network may announce its type is "automobile" and that it supports a display device with certain attributes, e.g., resolution, size, etc. Assume the mobile device attaches itself to the new network.

The mobile device will update its registry to include the Bluetooth network and its associated display device. Resource updates from the mobile device to the network facility likewise now list the new access network available to the device (Bluetooth), and any resources that have become available, i.e., the new display device.

This causes the network facility to assign a new profile to the mobile device wherein delivery and display of mobile video may now be effectuated on the newly discovered display device, i.e., the monitor in the automobile. Moreover, a policy restriction stated by the service provider preventing SMS messages from being received and initiated while in an automobile may cause the registry to disable the SMS application, thus preventing the user from launching or receiving SMS messages.

Thus, the user may now view mobile content on the automobile display, rather than on the display of the mobile device, and may not initiate or receive SMS messages while connected to the automobile's Bluetooth network. Alternatively, the service provider may choose to display a warning message to the user without disabling any of the applications in the mobile device.

Similarly, the device internal sensors may identify a particular physical orientation or other characteristic of the device, and cause the network facility to enable or disable based thereon. For example, if the device is being held to the ear, then a rule may be provided that video content is on the automobile display rather than the mobile device display.

Turning now to the drawings and, with particular attention to FIG. 1, a diagram of a telecommunications system 100 according to an embodiment of the present invention is shown. The telecommunications system 100 may include a network facility, such as a service delivery platform 102, which may include or be in communication with a resource map 104, a resource profile 106, and a recognition unit 115.

As will be explained in greater detail below, the resource map 104 contains an environment map of resources available to particular users, while the resource profile 106 defines particularized rules for making those resources available. The recognition unit 115, as will be explained in greater detail below, contains matching rules for comparing access policies to the user device's environment maps. That is, the service delivery platform 102 makes the resources available to the user devices in accordance with the resource map 104, profile 106, and recognition unit 115.

The service delivery platform 102 may include or be in communication with one or more user devices 108, and one or more Home Location register (HLR) databases 116. Typically, as will be explained in greater detail below, an HLR 116 is provided for each cell site in the network to which the user device is registered. The user devices may further include or be in communication with resource registries 110, capabilities lists (CL) 112, and resource monitors 114.

As will be explained in greater detail below, the resource monitor 114 monitors the network and resource environment (either passively or actively) for devices or resources that have become available or unavailable.

The capabilities lists 112 are lists maintained by all network devices and resources. Specifically, it is envisaged that networks and devices, i.e., all resources, contain an internal capability list (CL) that contains not only the identification number of the resource but also attributes that may be of interest and use to applications. For example, a network CL may show the bandwidth, average latency, etc. A storage device CL may show the amount of available storage, the random access time, etc. A display device CL may show the resolution, number of pixels, etc. Indeed, the attributes in the CL for most popular devices and networks could be standardized. A particular device or entity's CL may be updated when it receives a CL from other resources.

Figure 2:
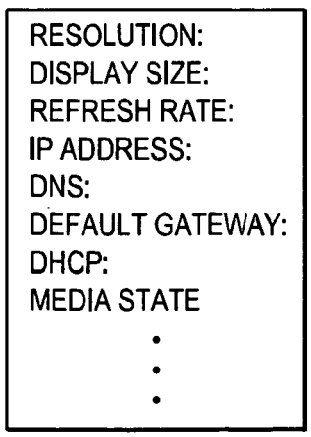
FIG. 2 illustrates a CL according to embodiments of the present invention.

The resource registries 110, on the other hand, are registries maintained by the user device of CLs of other devices that are currently available to it. FIG. 2 illustrates an exemplary CL for a display device that would be maintained in the registry of, say, a mobile telephone. Attributes in the CL describe the capabilities of the resource, its external interfaces, and intrinsic properties. For example, in the case of a display device, this can include resolution, display size, refresh rate, etc.

In certain embodiments, the user devices 108 may be implemented as telephones, cellular telephones, PDAs, computers, hard or soft clients, etc. While typically implemented as a smartphone, the user devices 108 also may be embodied as personal computers implementing a Windows operating system and the Explorer web browser. The user devices 108 thus may include telephony and other multimedia messaging capability using, for example, peripheral cameras, Webcams, microphones, and speakers (not shown) or peripheral telephony handsets.

In general, while the user devices 108 may implement one or more of the systems and methods described herein, the user devices also may implement one or more client devices or programs that communicate with services that implement such systems and methods provided remotely. In certain embodiments, the system 100 may also include other hardware and/or software components (e.g., gateways, proxy servers, registration server, presence servers, redirect servers, databases, applications, etc.).

The devices may also contain sensors for the state of the device and/or the state of its immediate environment, such as temperature and orientation. For example, several current mobile devices, such as smartphones, sense WiFi and cellular networks. Others sense the orientation of the device and allow the display to be used in either a portrait or a landscape mode, using a gravity-based pendulum sensor. In addition, proximity sensors turn the display off when the device is held to the ear.

In accordance with embodiments of the present invention, such physical sensors may be used to define not simply local characteristics of the telephone, but may be sent to the registry and uploaded to the network for use in implementing and/or determining network and device access policies.

As will be discussed in greater detail below, in order to receive information, a mobile device must be located by the network since it could physically be anywhere in the geographical area. Each mobile device periodically generates a message called the location update that is recorded in a Home Location Register (HLR) 116. The location update message typically contains the identity of the cell site in which the mobile device is currently located and some other network-related information, e.g., signal strength, etc.

Whenever the network needs to reach a mobile device, e.g., to initiate an incoming voice call, it sends a paging request to the last cell site in which the mobile device was located. Upon receiving the paging request the mobile device may respond to it. If, however, the mobile device has re-located to another cell site since the last location update, the paging request goes unanswered.

In accordance with embodiments of the present invention, the location update message from a mobile device 108 is further loaded with information about other resources that are currently "available" to the mobile device 108. Specifically, resources "announce" or make available their CLs. This may be achieved either by accepting a specific request on a well-defined interface and responding to the request or by doing a broadcast. The current generation of RFID devices, by way of example, announce themselves through a broadcast mechanism, as do certain WiMax and Wifi networks. The mobile device 108 receives the announcements and aggregates them into one or more resource updates. In some embodiments of the present invention, the announcements include other device CLs. The mobile device 108 periodically broadcasts these resource updates, which are then received by the service delivery platform 102.

As can be appreciated, such updates from the user devices to the service delivery platform 102 via the HLRs 116 could be bandwidth and/or processing intensive. As such, in accordance with embodiments of the present invention, any of a variety of techniques may be used to minimize such effects. For example, less-bandwidth-intensive binary encoding may be used for the uplink registry messages. Alternatively, or additionally, rather than having the uplink occur every time the HLR is updated, it may occur only every other time, or every tenth time, or any other predetermined period. Also, rather than having periodic updates, in some embodiments, the registry upload may occur only if the registry itself has actually been updated.

Furthermore, the service delivery platform 102, in conjunction with the recognition unit 115, the resource map 104 and resource profile 106, may implement one or more databases (not shown) that will require speedy and frequent updates. Accordingly, embodiments of the present invention may make use of "active" databases to accommodate the heavy traffic.

Figure 3:
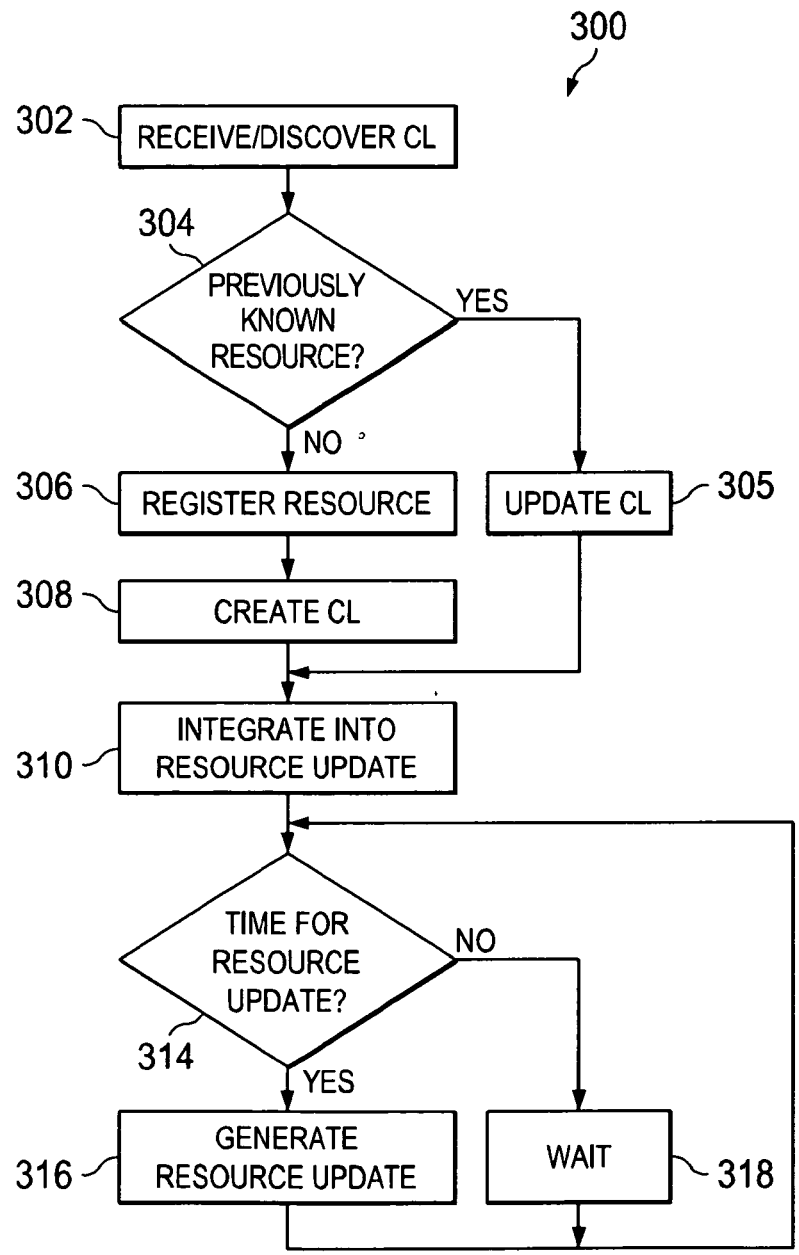
FIG. 3 is a flowchart illustrating operation of embodiments of the present invention.

Turning now to FIG. 3, a flowchart 300 illustrating operation of embodiment of the present invention is shown. The particular arrangement of elements in the flowchart 300 is not meant to imply a fixed order to the elements; embodiments can be practiced in any order that is practicable. More particularly, the flowchart 300 illustrates the aggregation process in a mobile device for a plurality of CLs In a process step 302, the mobile device 108 receives or discovers a CL. Receipt or discovery may be an out-of-band process and may be accomplished through the resource broadcasting or otherwise announcing presence and/or the CL.

In a process step 304, the user device 108 and, particularly, the resource monitor 114, checks if the CL is from a previously known resource. An affirmative response can lead to updating of the CL in the user device's lists (typically, the received CL may itself be updated and thus different from that previously stored), in a process step 306. Once updated, the information is integrated into the next resource update to the service delivery platform 102, as shown at process step 312. More particularly, the information is loaded with the location information to the Home Location Register 116, which provides it to the service delivery platform 102. As noted above, this may be sent with every HLR update, or on an event basis or some periodic basis, and/or using a low bandwidth binary encoding.

If, in process step 304, the CL was determined to be unknown, the resource will be registered in the mobile device registry 110, in a process step 308. A new CL is created for the new resource from the received CL in a process step 310, and the new CL is integrated into a resource update, in a process step 312. Once a resource update is ready, the update is sent to another process 1000 that perpetually loops on a timer at process step 314, and periodically generates a resource update, at steps 316, 318.

As noted above, resource updates from mobile devices are received and stored by the Service Delivery Platform (SDP) 102. Using information from the resource updates, the SDP 102 constructs a conceptual map 104 of the immediate environment of a mobile device, generates a resource profile 106 of a current environment of the device, and uses the recognition unit 115 to allow or disallow functionality based on the map.

Figure 4:
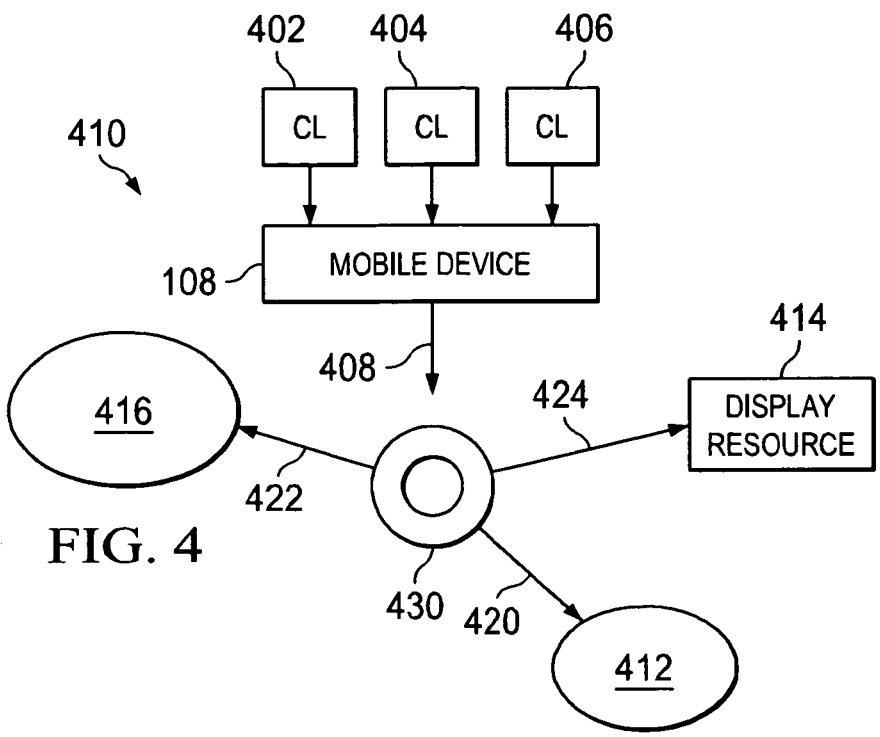
FIG. 4 is a diagram of an exemplary system map according to embodiments of the present invention.

For example, shown in FIG. 4 is a user device 108 that has received CLs from other resources 402, 404, 406. The CLs 402, 406, 408 may be, for example, a cell site, a display resource, and a network resource. The mobile device 108 integrates these CLs into a resource update 408 which in turn is broadcast by the mobile device 108 and received and stored by the SDP 102.

The stored representation of the environment is shown at 410 and includes a cell site 412, a display resource 414 and a network resource 416. The resources 412, 414, 416 correspond to the CLs 402, 404, 406, respectively. It is noted that the graphical representation of FIG. 4 is for purposes of simplicity only; the typical environment map uses internal digital computer data structures to effectively store objects such as CL 402, 404, 406.

In the example illustrated, the informational attributes of CL 402 may describe a cell site of a cellular network 412 with interface 420; the informational attributes of CL 404 may describe a RFID display device depicted as 414 with interface 424; and the informational attributes of CL 406 may describe a WiFi network depicted as 416 with interface 422. The mobile device itself is shown as a unitary structure 430 for purposes of this depiction but will be discussed later.

Thus, with reference to FIG. 4, the environment map 104 of the mobile device 108 shows that the device is in association with a display device 414 using interface 424, and has access to two networks 412 and 416 using interfaces 420, 422 respectively, the former being a WiFi network and the latter a cellular network.

The inventions discussed herein do not presuppose that a resource is necessarily associated exclusively with a single mobile device. Resources may be shared between multiples of mobile devices. It is also envisaged that the SDP 102 maintains an environment map for a plurality of mobile devices and, typically, maintains one map for all mobile devices in its purview.

Figure 5:
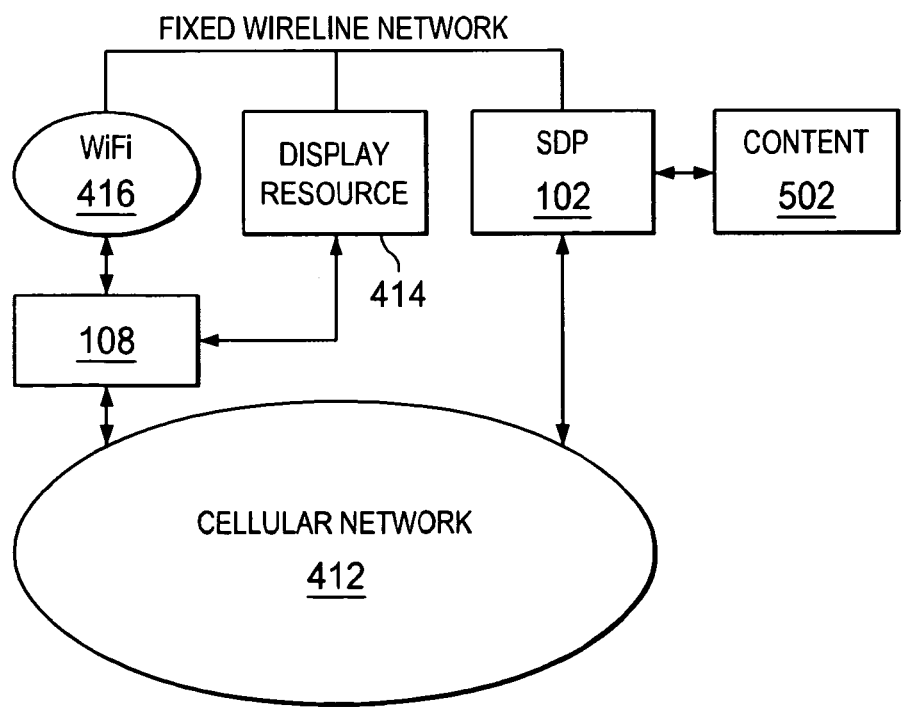
FIG. 5 is a diagram of an exemplary system map according to embodiments of the present invention.

As noted above, the environment map of mobile devices may be used to efficiently deliver to and receive information from the mobile devices. As an exemplary case, consider the problem of delivering video content from a source to the mobile device whose map 104 is depicted in FIG. 5.

The mobile device 108 is associated with a display resource 414, a cellular network 412 and a WiFi network 416. Also shown are a variety of network paths, 101, 201, 301, 501, 601, 701. Given the environment map of mobile device 108, a service profile 106 (FIG. 1) may be associated with the device that specifies that video content from a content server 502 may be delivered to either the mobile device 108 or to the display resource 414 and may further define the network path for the delivery.

In particular, the SDP 102 may choose a network path 101, 201, 301 to deliver the video content to the display resource 424. Alternatively, it may deliver the video content using the network path 101, 201, 501, 601, 301 to the mobile device 108; or it may also use the network path 701, 412. The service profile may further direct the mobile device 108 to consume the video content or to "relay" content to the display resource 424. Such a directive may be dictated by policies stated by the service provider. The SDP 102 may contain service logic using cost functions to choose any one of these paths. It may also use current network traffic and policies to prefer one path over the other possible paths.

If the SDP 102 chooses to deliver the video content to the display resource 424 and not the mobile device 108, it may first seek permission from the mobile device 100 by engaging in user dialog, such as via a graphical user interface. It is thus apparent that a user of a mobile device 108 may request video content from a server and in some cases, as depicted in FIG. 5, the video content will be received and relayed by the mobile device 108, to be displayed on a device 424 in close proximity to the mobile device.

Continuing with the example shown in FIG. 5, if the environment map of the mobile device 108 depicts that the device is in association with, for example, a Bluetooth (WiFi) network 416 generated by an automobile, the system and method of the present invention may employ a recognition unit 114 to examine the environment map 104 of a mobile device 108 to recognize that the mobile device 108 is in a pre-defined context, e.g., in an automobile and may limit access to features and services in response.

Figure 6:
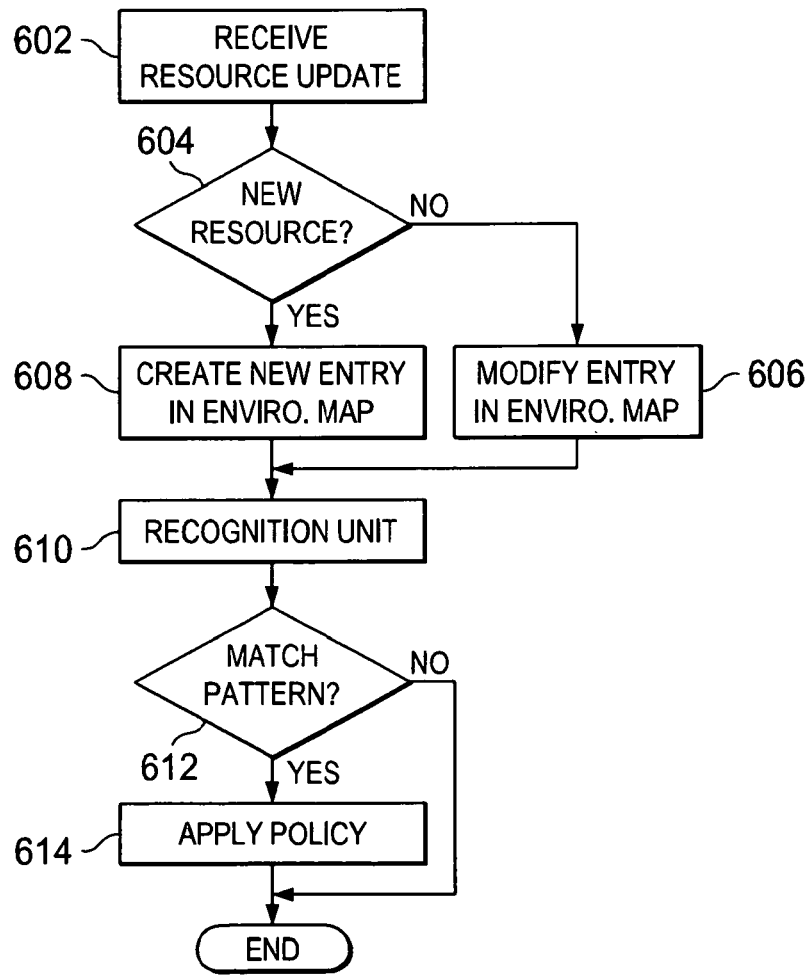
FIG. 6 is a flowchart illustrating operation of embodiments of the present invention.

This is explained further with reference to FIG. 6. The SDP 102 receives resource updates in step 602, and determines whether a resource update is for a new or a previously known mobile device (step 604). Steps 606 and 608 incorporate the received resource update into the environment map 104. In step 610, a recognition unit 115 containing pre-defined pattern matching rules is invoked that examines the environment map 104 for the mobile device 108 with the recently received resource update to determine if the map matches any of the pattern-rules of the recognition unit 115.

If a match is found, i.e., the mobile device 108 is determined to be in a pre-defined network or context or environment, e.g., connected to an automobile wifi network 416, then the recognition unit 115 returns an affirmative response and may apply a service provider policy to the environment of the mobile device, e.g., restrict SMS usage.

In another exemplary embodiment, the SDP 102 may dictate the network path chosen to deliver the video content to the display resource 424 and not to the mobile device 108. The policy enforced by the SDP 102 on behalf of the service provider may be the result of safety considerations calculated by the service provider. Thus, the user of a mobile device 108 in an automobile may view video content on the external display provided by the automobile.

Continuing further with the example depicted in FIG. 5, suppose the mobile device 108 is to be used to transmit content to the network, i.e., in the uplink direction. Again, it is apparent, that the mobile device 108 may query the environment map 104 via the SDP 102 to select a suitable network interface to use for making the transmission.

The present embodiment envisages that computing, display, storage and network resources may be abundantly available to a mobile consumer, and the consumer may choose to use such resources through the system and method described in the present invention. Moreover, as the consumer travels, his environment and availability of resources changes, the changes being recorded in the registries and environment map corresponding to the user's mobile device.

The description of the present embodiment, so far, has concentrated on the external resources available to a mobile device 108, and not on the applications available within the device itself. It is envisaged, as previously stated, that mobile devices contain a registry of all applications that have been loaded on to a mobile device by the service provider or by the user himself. Applications that are not registered in the registry are considered as "rogue" applications and are outside the scope of the present invention.

As described earlier, the environment map for a mobile device depicts the immediate environment of the mobile device and the SDP 102 assigns a network profile 106 to the mobile device based on the current environment map 104. It is envisaged by the present invention that the SDP 102 is also aware of the applications within the registry of the mobile device 108, and when assigning a service profile, may enforce one or more policies on the profile that cause the enablement or disablement of certain applications in the mobile device or impact delivery of information to the mobile device by other network elements.

Continuing with the example of FIG. 5, the exemplary depiction shows mobile device 108 in association with a WiFi network resource 416 generated by an automobile. This association may be assumed to trigger a policy that disables the web browser and the SMS applications in the registry of the mobile device 108. Thus, the user of the mobile device 108 will not be capable of launching the SMS or the web browser applications from the mobile device. Furthermore, the service provider may trigger network elements to disable the delivery of messages to the mobile device in question, e.g., by marking the status of the mobile device as "unavailable" in the HLR will temporarily stop delivery of messages, including SMS messages, to the mobile device.

Figure 9:
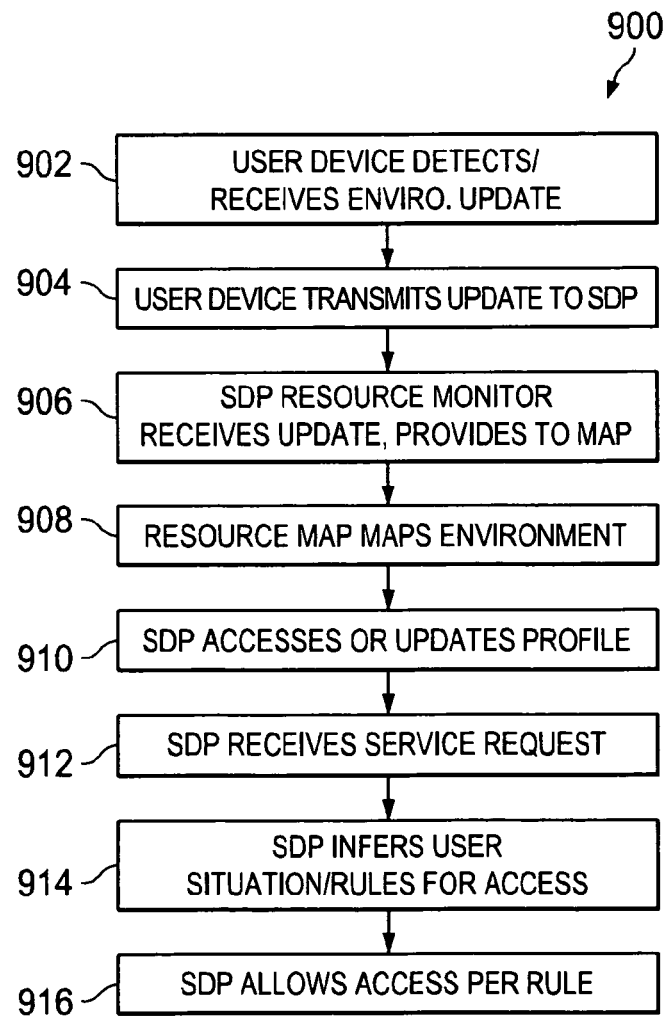
FIG. 9 is a flowchart illustrating operation of embodiments of the present invention.

Turning now to FIG. 9, a flowchart 900 illustrating operation of embodiment of the present invention is shown. The particular arrangement of elements in the flowchart 900 is not meant to imply a fixed order to the elements; embodiments can be practiced in any order that is practicable.

In a process step 902, a user device 108 receives or detects the addition of one or more new programs, resources, or processes that may be available to it. The new additions can include new CLs 112 and result in an updated resource registry 110, as discussed above. In a process step 904, the user device transmits the update to the SDP 102. As discussed above, this can include the user device 108 transmitting a location signal to the Home Location Register and piggy-backing the CL and registry information on top. The HLR 116 in turn provides the information to the SDP 102.

In a process step 906, the SDP 102's resource monitor 114 receives the update and provides the information to the resource map 104. In response, in a process step 908, the resource map 104 determines a new environment map for the user device (and other devices). In a process step 910, the SDP 102's recognition unit 115 accesses or updates the resource profile 106 of the particular device whose update has been received. As noted above, the profile includes one or more rules based on inferences from user contexts resulting from knowledge of the user position, device orientation, etc.

In a process step 912, the SDP 102 can receive a service request from a user device. For example, as discussed above, this can include requests for video content or the like. In a process step 914, in response, the SDP 102's recognition unit 115 determines a user situation or device, i.e., accesses and applies the rules or policy for user access to the program or application or resource. Finally, in a process step 914, the SDP 102 can allow access per the rules.

Figure 7:
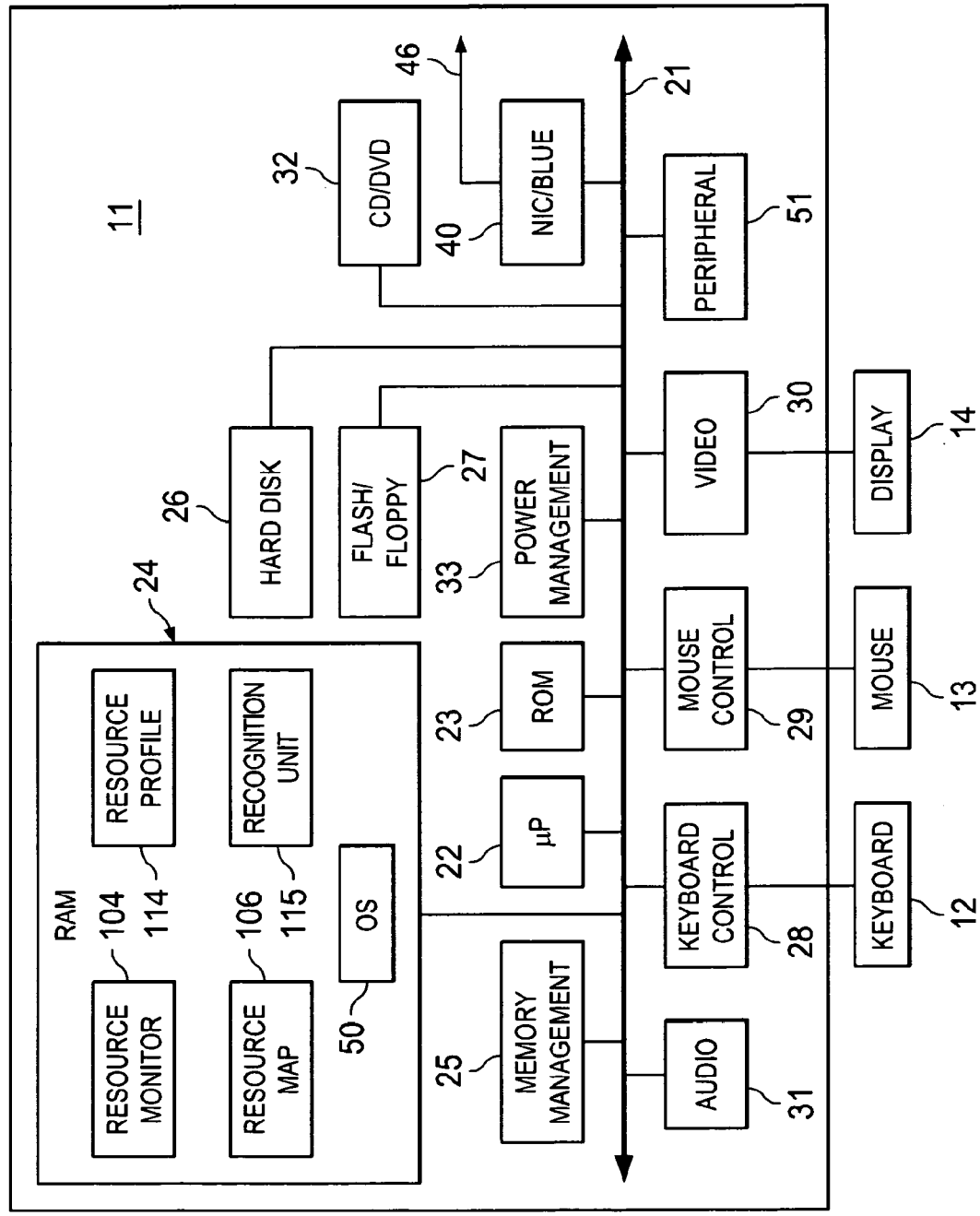
FIG. 7 is an exemplary SDP in accordance with embodiments of the present invention.

FIG. 7 shows a block diagram of components of a service delivery platform or service provider implemented as a computing device 700, e.g., personal, or laptop computer or server. In some embodiments, the computing device 700 may implement one more elements of the methods disclosed herein.

The system unit 11 includes a system bus or a plurality of system buses 21 to which various components are coupled and by which communication between the various components is accomplished. A processor 22, such as a microprocessor, is coupled to the system bus 21 and is supported by the read only memory (ROM) 23 and the random access memory (RAM) 24 also connected to the system bus 21. The computer 700 may be capable of high volume transaction processing, performing a significant number of mathematical calculations in processing communications and database searches. A Pentium™ or other similar microprocessor manufactured by Intel Corporation may be used for the processor 22. Other suitable processors may be available from Freescale Semiconductor, Inc., Advanced Micro Devices, Inc., or Sun Microsystems, Inc. The processor 22 also may be embodied as one or more microprocessors, computers, computer systems, etc.

The ROM 23 contains among other code the basic input output system (BIOS) which controls basic hardware operations such as the interaction of the disk drives and the keyboard. The ROM 23 may be embodied, e.g., as flash ROM. The RAM 24 is the main memory into which the operating system and applications programs are loaded. The memory management chip 25 is connected to the system bus 21 and controls direct memory access operations including passing data between the RAM 24 and hard disk drive 26 and removable drive 27 (e.g., floppy disk or flash ROM "stick"). A CD ROM drive (or DVD or other optical drive)

32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13 (or other cursor pointing device); the video controller 30 is the hardware interface for the video display 14; and the audio controller 31 is the hardware interface for a speaker and microphone (not shown). It is noted that while the various I/O controllers are illustrated as discrete entities, in practice, their functions may be performed by a single I/O controller known as a "super I/O." Thus, the figures are exemplary only.

In operation, keyboard strokes are detected by the keyboard controller 28 and corresponding signals are transmitted to the microprocessor 22; similarly, mouse movements (or cursor pointing device movements) and button clicks are detected by the mouse controller and provided to the microprocessor 22. Typically, the keyboard controller 28 and the mouse controller 29 assert interrupts at the microprocessor 22. In addition, a power management system 33 may be provided which causes the computer to enter a power down mode if no activity is detected over a predetermined period.

One or more network interfaces 40 enable communication over a network 46, such as a packet network like the Internet. The network interfaces 40 may be implemented as wired or wireless network interfaces operating in accordance with, for example, one or more of the IEEE 802.11x standards and may also or alternatively implement a Bluetooth interface.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, a removable drive 27, or the flash ROM.

As shown in the figure, the operating system 50, resource monitor 104, resource map 106, resource profile(s) 114, and recognition unit 115 are resident in the RAM 24. The operating system 50 functions to generate a graphical user interface on the display 14.

Execution of sequences of the instructions in the programs causes the processor 22 to perform various of the process elements described herein. In alternative embodiments, hard-wired circuitry may be used in place of, or in combination with, software instructions for implementation of some or all of the methods described herein. Thus, embodiments are not limited to any specific combination of hardware and software.

The processor 22 and the data storage devices 26, 27, 32 in the computer 700 each may be, for example: (i) located entirely within a single computer or other computing device; or (ii) connected to each other by a remote communication medium, such as a serial port cable, telephone line or radio frequency transceiver. In one embodiment, the computer 100 may be implemented as one or more computers that are connected to a remote server computer.

Figure 8:
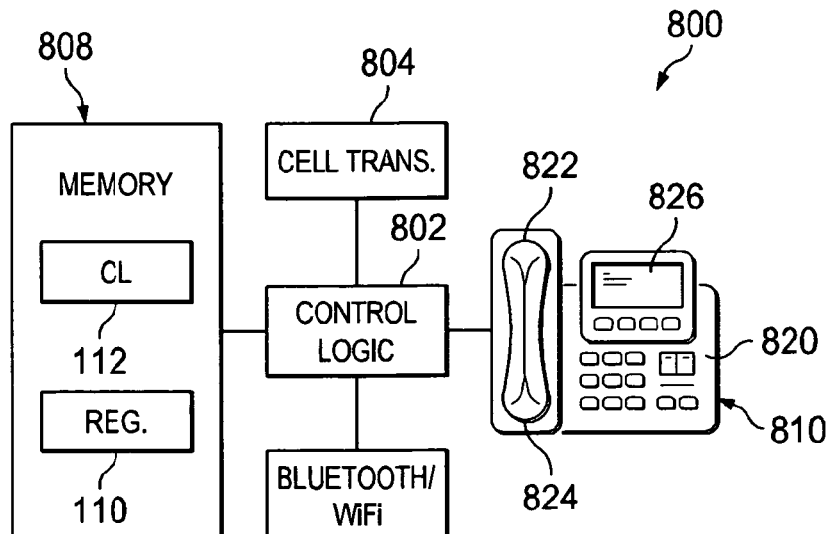
FIG. 8 is an exemplary user device in accordance with embodiments of the present invention.

As noted above, embodiments of the present invention may be implemented in or in conjunction with a telephone, such as a wireless or cellular "smart" telephone. An exemplary cellular telephone 800 including capabilities in accordance with an embodiment of the present invention is shown in FIG. 8. In some embodiments, the cellular telephone 800 may implement one or more elements of the methods disclosed herein. As shown, the cellular telephone includes control logic 802 and cellular transceiver 804. The cellular transceiver 804 allows communication over a cellular telephone network, such as a GSM or GPRS based cellular telephone network. The control logic 802 generally controls operation of the cellular telephone and, in some embodiments, implements CLs and resource registry, as well as other services or clients in accordance with embodiments of the present invention.

The control logic 802 interfaces to a memory 818 for storing, among other things, contact or address lists 107. The control logic 802 also interfaces to a user interface(s) 810. The user interface(s) 810 can include a keypad 820, speaker 822, microphone 824, and display 826. The keypad may include one or more "hard" keys, but may be implemented in whole or in part as a cursor pointing device in association with one or more "virtual" keys on the display 826. In general, a user may make use of the keypad 820 and display 826 to enter contact information, and may speak into the microphone to provide the audio input(s). It is noted that other interfaces, such as voice-activated interfaces may be provided. Thus, the figure is exemplary only. In addition, a Bluetooth or WiFi interface 806 may be provided. A memory 808 for storing program code and data, such as the CL 112 and registry 110, also may be provided.

While specific implementations and hardware/software configurations for the mobile device and SDP have been illustrated, it should be noted that other implementations and hardware configurations are possible and that no specific implementation or hardware/software configuration is needed. Thus, not all of the components illustrated may be needed for the mobile device or SDP implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method comprising:
   constructing a resource map storing a representation of an environment of each of a plurality of mobile devices, each of the representations being based on information obtained over a wireless network from the respective mobile devices, the information including 1) a capabilities list (CL) stored in a resource registry associated with the respective mobile devices, each of the CLs specifying one or more attributes of an external resource available to the respective mobile devices and 2) state information concerning a physical environment of the respective mobile devices obtained from one or more sensors associated with the respective mobile devices;

matching data in the resource map to policies to determine one or more profiles;

assigning the one or more profiles to one or more of the mobile devices;

wherein each of the assigned profiles allows or disallows the one or more mobile devices to access a specified one or more of the external resources represented in the resource map.

2. The method of claim 1 further comprising updating the resource map by receiving dynamic resource updates from the one or more mobile devices, the dynamic resource updates including information for updating the representations of the environments stored in the resource map.

3. The method of claim 2 further comprising modifying one or more of the assigned profiles based on the updating of the resource map.

4. The method of claim 3 wherein the modified assigned profiles are assigned to one or more of the plurality of mobile devices.

5. The method of claim 3 wherein the modified assigned profiles are re-assigned to the one or more mobile devices.

6. The method of claim 2 further comprising perpetually updating the resource map by receiving an ongoing series of dynamic resource updates.

7. The method of claim 2 further comprising receiving a dynamic update from one of the mobile devices when the mobile device undergoes a change in location.

8. The method of claim 2 further comprising receiving a dynamic update from one of the mobile devices when the state information concerning the physical environment of the mobile device changes.

9. The method of claim 2 wherein the dynamic resource updates are received by an active database.

10. The method of claim 2 wherein the one or more profiles are re-assigned based on the dynamic resource updates.

11. The method of claim 1 wherein the resource map is a conceptual map.

12. The method of claim 1 wherein one or more of the attributes of one or more of the capabilities lists (CLs) includes current resource availability information.

13. The method of claim 1 wherein the representation of the environment of at least two of the mobile devices have a common one of the external resources available to them such that the common external resource is sharable between the at least two of the mobile devices.

14. The method of claim 1 further comprising discovering or receiving at least one of the CLs from a broadcast by the external resource respectively associated with the CL.

15. The method of claim 1 further comprising discovering at least one of the CLs via an out-of-band process.

16. The method of claim 1 further comprising receiving at least one of the CLs via an out-of-band process.

17. The method of claim 1 further comprising allowing a first of the mobile devices access to at least one of the external resource and specifying a service with which the one or more external resources is to be associated.

18. The method of claim 17 wherein the information concerning the at least one external resource to which the first mobile device is allowed access is received from the first mobile device.

19. The method of claim 18 wherein the service is to be delivered to a user associated with the first mobile device from which the information was received.

20. The method of claim 17 further comprising provisioning the service in accordance with a preference of a user associated with the mobile device from which the information was received.

21. The method of claim 1 wherein the one or more external resources includes a network resource.

22. The method of claim 21 wherein the network resource is an automobile.

23. A service delivery platform operably coupled to one or more databases comprising:

a resource map storing a representation of an environment of each of a plurality of mobile devices, each of the representations being based on information obtained from the respective mobile devices, the information including 1) a capabilities list (CL), stored in a resource registry associated with the respective mobile devices, each of the CLs specifying one or more attributes of an external resource available to the respective mobile devices and 2) state information concerning a physical environment of the respective mobile devices obtained from the one or more sensors associated with the respective mobile devices;

a resource profile unit configured to match data in the resource map to policies to identify one or more profiles;

a recognition unit configured to dynamically assign the one or more identified profiles to one or more of the mobile devices;

wherein each of the assigned profiles allows or disallows the one or more mobile devices to access a specified one or more of the external resources represented in the resource map.

24. The service delivery platform of claim 23 further comprising a resource monitor configured to cause the resource map to be updated by receiving dynamic resource updates from the one or more mobile devices, the dynamic resource updates including information for updating the representations of the environments stored in the resource map.

25. The service delivery platform of claim 24 wherein the resource monitor is further configured to discover or receive at least one of the CLs from a broadcast by the external resource respectively associated with the CL.

26. The service delivery platform of claim 24 wherein the resource monitor is further configured to discover at least one of the CLs via an out-of-band process.

27. The service delivery platform of claim 24 wherein the resource monitor is further configured to receive at least one of the CLs via an out-of-band process.

28. The service delivery platform of claim 24 wherein the resource monitor is further configured to perpetually update the resource map by receiving an ongoing series of dynamic resource updates.

29. The service delivery platform of claim 24 wherein the resource monitor is further configured to receive a dynamic update from one of the mobile devices when the mobile device undergoes a change in location.

30. The service delivery platform of claim 24 wherein the resource monitor is further configured to receive a dynamic update from one of the mobile devices when the state information concerning the physical environment of the mobile device changes.

31. The service delivery platform of claim 24 wherein the resource monitor includes an active database to accommodate receipt of the dynamic resource updates.

32. The service delivery platform of claim 24 wherein the resource monitor is further configured to monitor the environments of the plurality of mobile devices in an active manner.

33. The service delivery platform of claim 24 wherein the resource monitor is further configured to monitor the environments of the plurality of mobile devices in a passive active manner.

34. The service delivery platform of claim 24 wherein the resource profile is further configured to modify one or more of the assigned profiles based on the updating of the resource map.

35. The service delivery platform of claim 24 wherein the resource profile is further configured to re-assign one of more of the assigned profiles based on the dynamic resource updates.

36. The service delivery platform of claim 34 wherein the recognition unit is further configured to assign the modified assigned profiles to one or more of the plurality of mobile devices.

37. The service delivery platform of claim 34 wherein the recognition unit is further configured to re-assign the modified assigned profiles to the one or more mobile devices.

38. The service delivery platform of claim 23 wherein the resource map is a conceptual map.

39. The service delivery platform of claim 23 wherein one or more of the attributes of one or more of the capabilities lists (CLs) includes current resource availability information.

40. The service delivery platform of claim 23 wherein the representation of the environment of at least two of the mobile devices have a common one of the external resources available to them such that the common external resource is sharable between the at least two of the mobile devices.

41. The service delivery platform of claim 23 wherein at least one of the assigned policies allows a first of the mobile devices access to at least one of the external resources and specifies a service with which the one or more external resources is to be associated.

42. The service delivery platform of claim 41 wherein the information concerning the at least one external resource to which the first mobile device is allowed access is received from the first mobile device.

43. The service delivery platform of claim 41 wherein the service is to be delivered to a user associated with the first mobile device from which the information was received.

44. The service delivery platform of claim 23 wherein the one or more external resources includes a network resource.

45. The service delivery platform of claim 44 wherein the network resource is an automobile.

46. The service delivery platform of claim 41 wherein the service is provisioned in accordance with a preference of a user associated with the mobile device from which the information was received.

* * * * *